United States Patent [19]

Daniels et al.

[11] Patent Number: 4,875,122
[45] Date of Patent: Oct. 17, 1989

[54] HEAD TRANSPORT ASSEMBLY HAVING SIMPLIFIED MUTUALLY INDEPENDENT POSITIONAL ADJUSTMENTS

[75] Inventors: Steven D. Daniels, Churchville; Daniel C. Maslanka; John E. Morse, both of Rochester, all of N.Y.

[73] Assignee: Eastman Kodak Company, Rochester, N.Y.

[21] Appl. No.: 167,679

[22] Filed: Mar. 14, 1988

[51] Int. Cl.$^4$ .............................................. G11B 5/56
[52] U.S. Cl. ................................................... 360/109
[58] Field of Search ................ 360/109; 369/215, 219

[56] References Cited

U.S. PATENT DOCUMENTS

| | | |
|---|---|---|
| 3,039,102 | 12/1957 | Fuller et al. . |
| 4,097,908 | 6/1978 | Chou ............................ 360/109 X |
| 4,099,852 | 7/1978 | Kobierecki et al. . |
| 4,110,803 | 8/1978 | Townsend . |
| 4,117,522 | 9/1978 | Whittle et al. . |
| 4,158,868 | 6/1979 | Jenkins . |
| 4,456,938 | 6/1984 | Baasch et al. . |
| 4,458,398 | 7/1984 | Goldstein et al. . |
| 4,475,281 | 10/1984 | Holecek . |
| 4,480,281 | 10/1984 | Cantivell . |
| 4,520,555 | 6/1985 | Gyi et al. . |
| 4,528,607 | 7/1985 | Thompson . |
| 4,550,352 | 10/1985 | Nakao . |
| 4,578,727 | 3/1986 | Hill . |
| 4,620,250 | 10/1986 | Hill . |

FOREIGN PATENT DOCUMENTS 60-195718  4/1985  Japan .

*Primary Examiner*—A. J. Heinz
*Attorney, Agent, or Firm*—David M. Woods

[57] ABSTRACT

A head transport assembly includes a sled supporting a magnetic head for movement along a guide path generally oriented toward the drive spindle of a drive motor. The sled, which is supported against a guide rod defining the guide path, includes two adjustment points along the guide rod—a first adjustment point proximate the head and a second adjustment point outboard of the first in relation to the drive spindle. By acting on the first point to pivot the sled about the second point, the head is brought onto a true radial path intersecting the center of the drive spindle. The azimuth of the head is next adjusted by acting on the second point to pivot the sled about the first point until the desired azimuth angle is obtained.

8 Claims, 4 Drawing Sheets

HEAD TRANSPORT ASSEMBLY HAVING SIMPLIFIED MUTUALLY INDEPENDENT POSITIONAL ADJUSTMENTS

BACKGROUND OF THE INVENTION

1. Field of the Invention

This invention relates to the field of magnetic recording and playback, and in particular to apparatus including a magnetic head supported for radial movement in relation to a flexible magnetic storage disk.

2. Description Relative to the Prior Art

In the course of manufacture, it is necessary to control six position parameters, or degrees of freedom, of a magnetic head in relation to a disk drive in which it is mounted for movement. These six parameters, with reference to FIG. 1, are: the penetration of the head into the plane of a rotating disk supported upon a disk drive spindle; the radial tracking orientation of the head with respect to a true radial path P intersecting the drive spindle; the azimuth rotation of the head about an axis normal to the plane of the disk at the head location; the attack angle rotation of the head about an axis through the head and coincident with the radial path; the tilt angle rotation of the head about an axis through the head and tangent to the radial path; and the lateral location for assuring accurate head indexing between tracks.

Though useful with a variety of head structures and disk drives, the present invention is disclosed in connection with the type of head structure shown in U.S. Pat. No. 4,620,250, in which the head protrudes through an elongated opening in a flat, circumferential stabilizer surrounding the head. As shown in this patent, penetration and the attack angle are set by the way in which the head is glued into the stabilizer (penetration) and fastened to the head transport (attack angle). It is further known, as shown in U.S. Pat. No. 4,456,938, to set the remaining (or all) degrees of freedom in a specialized fixture as the head is loosely positioned in a head carriage. A space allowing slight movement of the head is filled with inactive glue or cement that is activated, for example, by injection of a catalyst or by ultraviolet light, after the head's position has been properly adjusted.

Such a technique as practiced by the '938 patent may successfully set the various parameters, but only through a relatively complex procedure involving elaborate apparatus. For instance, in that disclosure, a stacked array of five rotary and linear motors supports a robotic type manipulator that holds the head for adjustment. The setting of the degrees of freedom is made in relation to a master flexible disk containing adjustment data tracks, which in turn are decoded by complicated electronic circuits.

SUMMARY OF THE INVENTION

A way has been found using inexpensive, low-precision parts and simple, rapid adjustments to set three of the degrees of freedom, namely, the radial tracking orientation and the azimuth and tilt angles. (While forming no part of this invention, the other degrees of freedom are set by adjusting the gear train driving the head transport assembly (lateral indexing accuracy) and by adjusting the head as it is glued to the transport assembly (penetration and attack angle)). A key effort during manufacture of a head transport assembly is to get the magnetic head to move along a radial path intersecting a central datum or reference, usually the center of the drive spindle of a disk drive motor. In accordance with the invention, a fixed guide path is provided relative to the housing supporting the drive motor for directing the head transport generally toward, but not necessarily intersecting, the drive spindle. Given any position of the guide path, that is, given ordinary tolerances during manufacture, it is nonetheless possible to find a precision path parallel to the guide path that follows a true radial and intersects the center of the motor spindle. A pair of simple adjustments are made relative to the guide path to align the head with the true radial path and, once so aligned, to set the azimuth of the head. By locating the head proximate one of the adjustment points, the adjustments are kept substantially independent, that is, a later setting of the azimuth does not substantially disturb the radial tracking orientation.

While the inspiration for the invention was in connection with magnetic recording, the concepts may be applied to any transducer (magnetic head, optical transducer, sensor, emitter, etc.,) in which radial and azimuth adjustments are necessary in relation to a rotating medium. In particular, therefore, the transport supports a transducer relative to a first adjustment point and a second adjustment point, the first point being nearer to the motor spindle than the second point. The transport is supported for movement along a guide path that is generally parallel to the true radial path. The two adjustment points are disposed proximate the guide path. Two degrees of freedom are set by (1) means (e.g., an adjustment screw) acting upon the first adjustment point to pivot the transport in relation to the second adjustment point until the transducer intersects the true radial path and by (2) means (e.g., another adjustment screw) acting upon the second adjustment point to pivot the transport in relation to the first adjustment point to set the azimuth angle of the transducer at a desired value. Furthermore, when the transducer is mounted in substantial collinear relation to a tangent axis taken through the radial path and the first adjustment point, a third degree of freedom (tilt angle) is set by pivoting the transport about the tangent axis.

BRIEF DESCRIPTION OF THE DRAWINGS

The invention will be described in relation to the drawings, in which.

DETAILED DESCRIPTION OF THE INVENTION

Since disk drives are well known, the present description will be directed in particular to elements forming part of, or cooperating more directly with, the present invention. Elements not specifically shown or described herein may be selected from those known in the art. For example, the specific structure of the transducer is unessential to the invention and therefore it will not be described in detail, other than to describe the transducer in connection with magnetic recording (as a magnetic head) and to show the aforementioned stabilizer surrounding the transducer. Likewise, the present invention is not concerned with the means providing movement of the transport assembly from one track to another relative to the magnetic disk. Consequently, a conventional drive technique, such provided by a gear train or a lead screw, can be employed to move the assembly radially with respect to the drive spindle.

Figure 2:
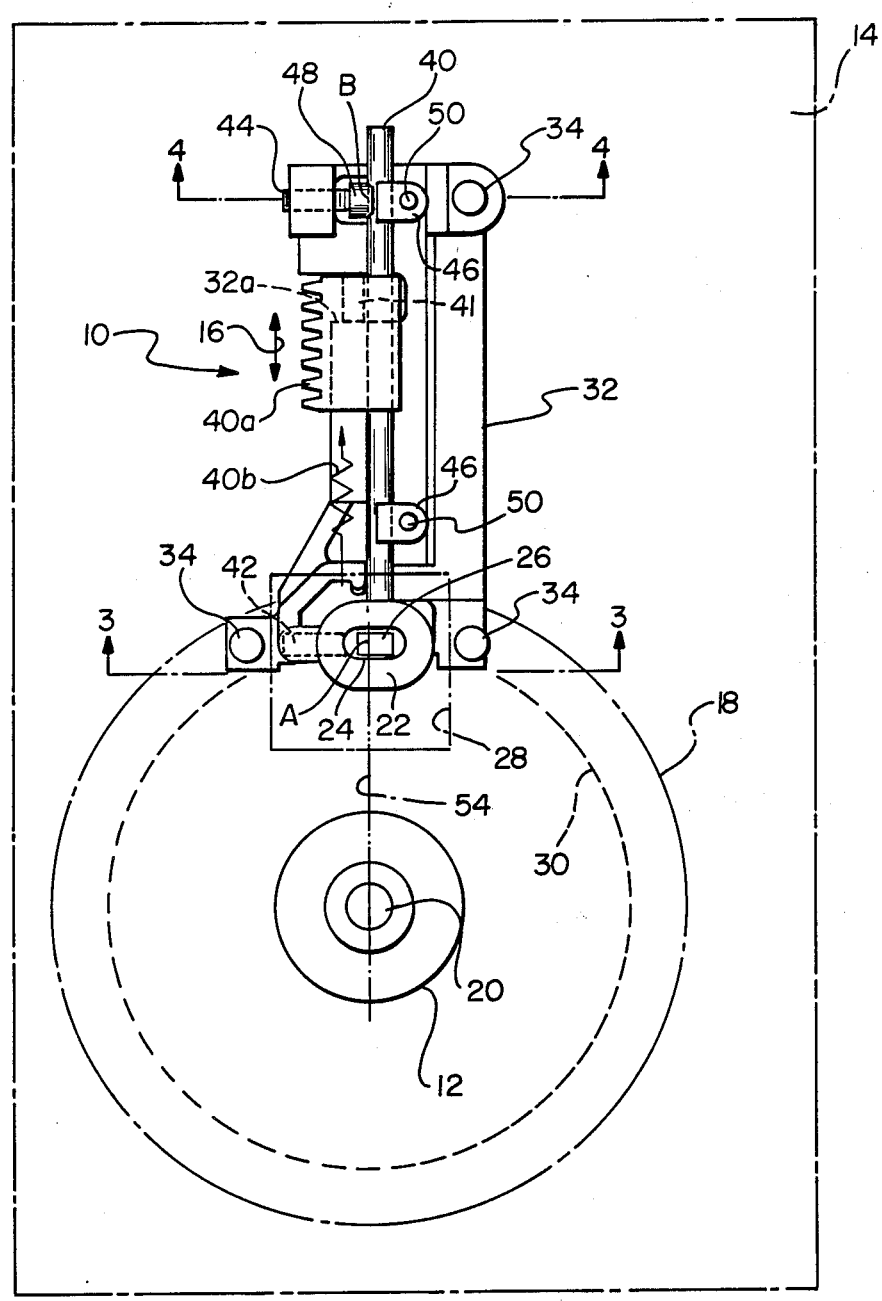
FIG. 2 is a plan view of the head transport assembly of the invention.
Figure 3:
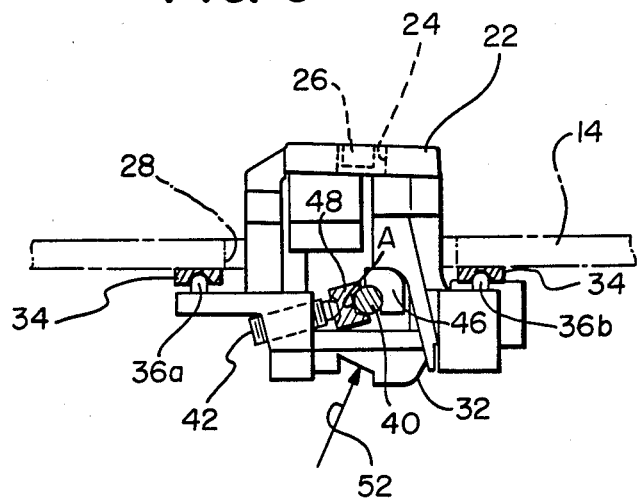
FIG. 3 is a cross-sectional view of the head transport assembly of FIG. 2 taken along the line 3—3 through the first adjustment point.
Figure 4:
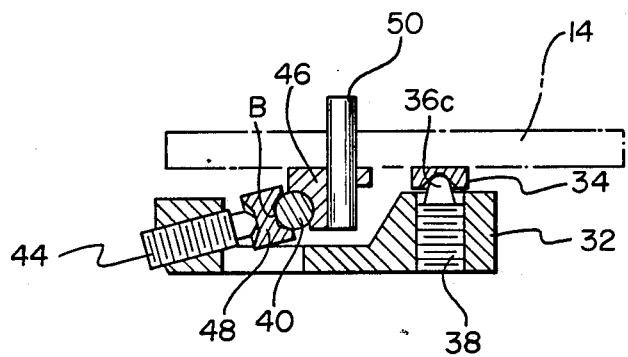
FIG. 4 is a cross-sectional view of the head transport assembly of FIG. 2 taken along the line 4—4 through the second adjustment point.

Referring now to FIG. 2 in conjunction with the cross-sectional views in FIGS. 3 and 4, a head transport assembly 10 and a disk drive motor 12 are shown in relation to a mounting plate 14. The transport assembly 10 slides relative to the motor 12 in a generally radial direction 16. A magnetic disk 18 is supported for rotation on a drive spindle 20 of the motor 12 (the disk may have, for example, a centrally-located hub that frictionally fits over the spindle 20). The head transport assembly 10 supports a stabilizer 22 of the type disclosed in the aforementioned U.S. Pat. No. 4,620,250. The stabilizer 22 has an elongated opening 24 for exposing a magnetic head 26. The mounting plate 14 and the magnetic disk 18 are shown in broken line to indicate that, particularly in the plan view of FIG. 2, the transport assembly 10 largely underlies the mounting plate 14 and the disk 18, that is, the mounting plate 14 is interposed between the transport assembly 10 and the disk 18. For that reason, the mounting plate 14 has an aperture 28, also shown in broken line in FIG. 2, through which the stabilizer 22 and the head 24 project to contact the recording layer of the disk 18 (which is therefore positioned with such layer toward the mounting plate 14). More specifically, the head 26 is shown in FIG. 2 in position for tracing (either for recording or playback) a data track 30 on the disk 18. Because the disk 18 ordinarily contains many such data tracks in concentric relation, the transport assembly 10 is moved back and forth, as required, in the radial direction 16 to align the head 26 with a selected track.

The head transport assembly 10 includes an elongated sled 32 supported for sliding movement against the mounting plate 14 on three pads 34. As better shown in FIGS. 3 and 4, the three pads 34 are interposed between the plate 14 and three feet 36a, 36b and 36c depending from the sled 32. As is shown in FIG. 4, the foot 36c is formed on the end of an adjusting screw 38 for setting the tilt angle of the head 26. The sled 32 is confined to move along a guide path defined by a guide rod 40 that is captured between first and second adjustment screws 42 and 44 and a pair of bushings 46. Though, as heretofore emphasized, the means of movement is conventional, it is preferable to drive the rod 40; one approach is shown in broken line in FIG. 2, in which a rack gear 40a is attached to the rod 40 for cooperation with a drive pinion (not shown). The sled, furthermore, has a removed area 32a underlying the guide rod 40. Since the rod 40 and the sled 32 are separable parts, a catch 41 depending from the rack gear 40a is captured within the removed area 32a to provide the necessary mechanical linkage. A spring 40b between the sled 32 and the plate 14 loads the sled 32 radially outward against the rack 40a. In practice, therefore, the guide rod 40 and the sled 32 move in unison relative to the stationary bushings 46.

The screws 42 and 44 are threaded through the sled 32 into a pair of horizontal adjustment blocks 48 that cradle the rod 40. The bushings 46, which are fastened to the mounting plate 14 by a pair of pins 50, support the guide rod 40 on the side opposing the adjustment blocks 48, thus constraining the sled to move in a direction dictated by the orientation of the guide rod 40. The head transport assembly 10 is held in place by a force (generally shown in FIG. 3 by a vector 52) urging the sled 32 against the bushings 46 with the guide rod 40 therebetween. This force can be provided by a variety of conventional sources, such as a spring-biased member thrust against the sled 32.

The first and second adjustment screws 42 and 44 and the horizontal adjustment blocks 48 therewith define first and second adjustment points A and B at the approximate juncture of the respective block 48 and the guide rod 40. The first adjustment screw 42 acts upon the first adjustment point A through a component of the force exerted by the vector 52; likewise, the second adjustment screw 44 acts upon the second adjustment point B due to the force vector 52. In both cases, the adjustment screws 42 and 44 also act in relation to the sled 32. That is, while the adjustment points A and B are fixed in relation to the mounting plate 14 and the drive spindle 20, the sled 32 is adjustable relative to the plate 14 and the drive spindle 20 by turning the adjustment screws 42 and 44. What this means for head travel is that the requirement for aligning the bushings 46 can be relaxed and the final, precision adjustments can instead be completed by turning the adjustment screws 42 and 44. The objective is to align the sled 32 so that the head 26 (or, more precisely, the active gap region thereof) moves along a true radial path 54 that substantially intersects the center of the drive spindle 20. Instead of painstakingly locating the bushings 46, accurately machining the guide rod 40 as well as the bushings 46, and then precisely locating the head 26 in relation to the underlying guide rod 40, these tolerances can be relaxed and the final adjustments simply made by turning the screws 42 and 44 until the head 26 is aligned with the path 54 at the proper azimuth angle.

For the purpose of describing the components of the head transport assembly 10 in correct alignment, FIGS. 2, 3 and 4 illustrate a hypothetical situation in which the guide path of the transport assembly 10 exactly aligns with the true radial path 54 without adjustment. In practice, such "one-shot" alignment is virtually unattainable and, indeed, unnecessary in view of the present invention. More typically, the transport assembly 10 is initially put in place against the bushings 46 such that the path of head travel fails to intersect the center of the motor spindle 20. In such a configuration, and despite the misalignment, the guide rod 40 continues to define the guide path for the sled 32. This works because of an essential geometric relation between the guide path and the true radial 54, to wit, whatever the location of the guide path, another path can always be found parallel to the guide path that is also coincident with the true radial 54. The adjustment screws 42 and 44 are consequently adjusted to find this true path. These adjustments become especially manageable by mounting the head 26 in relation to the sled 32 so that it is in reasonable proximity with the first adjustment point A, that is, overlying the adjustment point A (as shown by FIG. 3). This head orientation tends to separate the adjustment of radial tracking from the azimuth angle, thus substantially diminishing their interaction as the adjustments are made.

Figure 5:
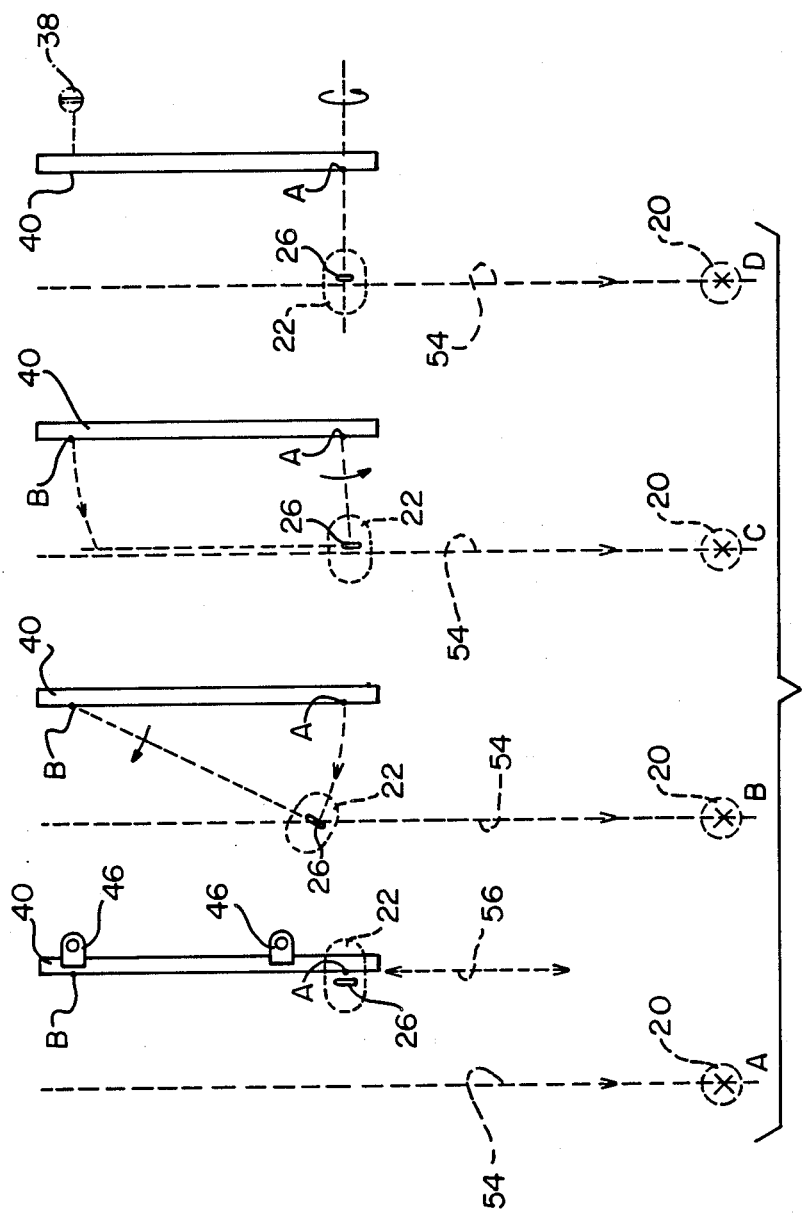
FIGS. 5A–5D are schematic views of portions of the transport assembly, showing the adjustment points and the technique of manipulating the head relative to these points.

The adjustments made to the head 26 in relation to the adjustment points A and B and the radial path 54 are shown diagrammatically in connection with the sections of FIG. 5. The guide rod 40 slides against the bushings 46 (as shown by FIG. 5A) in a direction defined as a guide path 56. The location of the rod 40 is shown in FIG. 5A to be misaligned with respect to the spindle 20 (the dimensions in FIG. 5 are highly exaggerated in order to facilitate the description). Except for the scale of misalignment, FIG. 5A is typical of the initial assembly during manufacture. With the drive motor 12 and the transport assembly 10 assembled to the mounting plate 14, a particular radial path 54 is optically sighted that is parallel to the guide path 56 and intersects the center of the drive spindle 20. (Such sighting techniques are well-known in connection with assembly procedures.)

Figure 1:
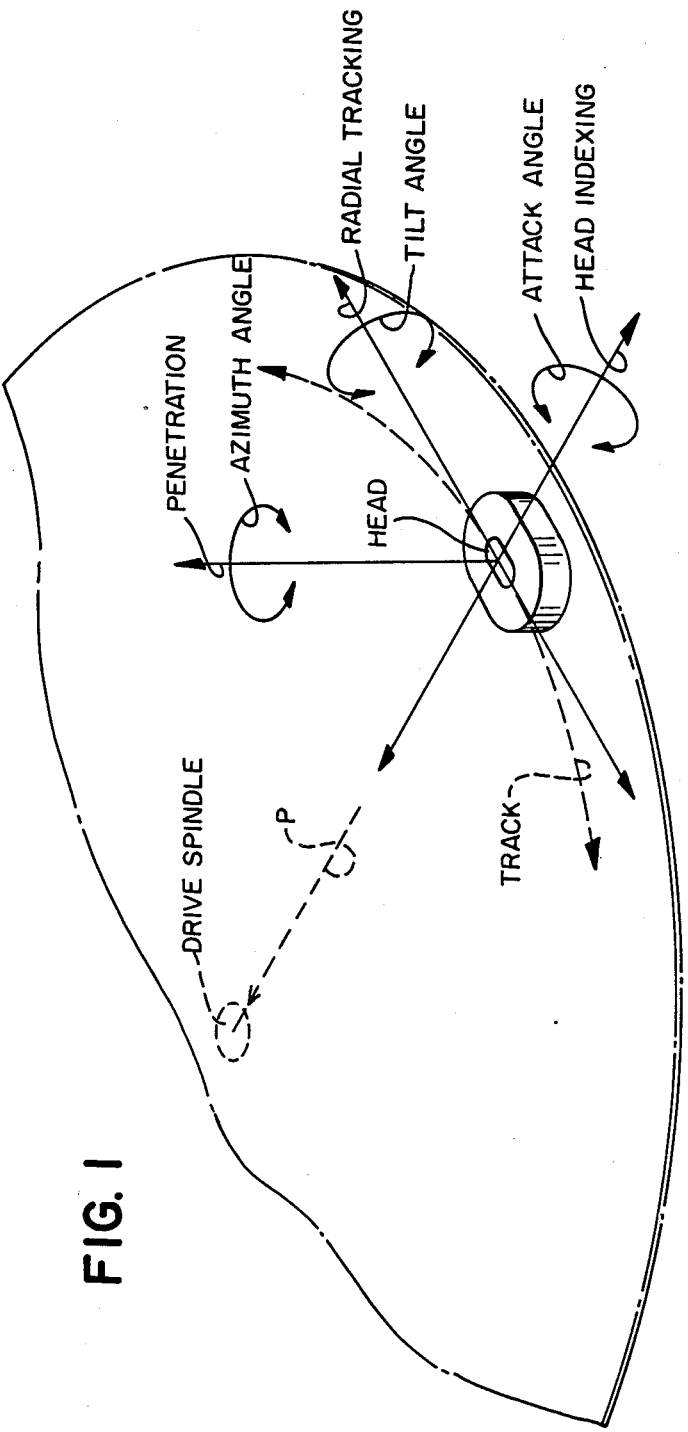
FIG. 1 is an illustration of the six degrees of freedom that define the position of a head relative to a magnetic disk supported for rotation on a drive spindle.

Radial tracking is first set. The first adjustment screw 42 (FIG. 2) is turned to act upon the first adjustment point A and pivot the sled 32 about an axis orthogonal to the guide path 56 at the second adjustment point B until the intersection of the head 26 (or, more precisely, the active gap region thereof) with the path 54 is optically sighted. This adjustment is shown in FIG. 5B. Next the azimuth angle is set. The second adjustment screw 44 (FIG. 2) is turned to act upon the second adjustment point B and pivot the sled 32 about an axis orthogonal to the guide path 56 at the first adjustment point A until the correct azimuth angle of the active gap region is obtained; this is conventionally done by observing the playback level in relation to azimuth adjustment as a prerecorded test track on a test disk is reproduced. The mechanical aspect of this adjustment is shown in FIG. 5C. At this point, the sled 32 and the guide rod 40 may be moved along the guide path 56 while the movement of the head 26 follows the radial path 54 intersecting the center of the drive spindle 20. (Unlike the exaggerated angles shown in FIG. 5, the typically minute angular adjustments made in practice provide substantial, and sufficient, alignment of the head 26 with the radial path 54.) FIG. 5D illustrates the adjustment of the tilt angle of the head 26. In keeping with the invention, the head 26 is located in substantially collinear relation to a tangent taken through the radial path 54 and the first adjustment point A. The tilt angle is adjusted by pivoting the sled 32 about this tangent. Furthermore, by having the head 26 in collinear relation to the front pads 34, the tilt adjustment may be made without substantially affecting the penetration parameter (see FIG. 1). While the pivoting force may be applied in a variety of places relative to the tangent axis, the adjusting screw 38 (FIG. 4) advances or retracts the foot 36c in relation to the respective pad 34 and thereby pivots the sled 32 about the aforementioned tangent.

The invention has been described in detail with particular reference to a presently preferred embodiment, but it will be understood that variations and modifications can be effected within the spirit and scope of the invention. For example, the first and second adjustment points A and B define a line that coincides with the guide path 56 (i.e., the points A and B are collinear with the path 56). However, the choice of the broken line 56 to illustrate the guide path is arbitrary since the sled 32 in its entirety moves in the direction of the guide path. Thus the guide path could be defined to be elsewhere and the line including the adjustment points A and B would then be parallel to the guide path. Moreover, exact alignment of the points A and B in relation to the guide path is not absolutely necessary, i.e., it is sufficient that the points A and B are proximate the guide path, or proximate a line parallel to the guide path.

What is claimed is:

1. A transport assembly for supporting a transducer in relation to a recording medium mounted for rotation on a drive motor and for moving the transducer through a path intersecting a spindle of the drive motor, said assembly comprising:

a transport for supporting the transducer relative to a first adjustment point and a second adjustment point outboard of said first adjustment point in relation to the motor spindle;

means for supporting said transport for movement along a guide path that is generally parallel to the path intersecting the drive motor, said adjustment points being proximate said guide path;

means acting upon the first adjustment point for pivoting said transport about said second adjustment point thereby to intersect the transducer with the path intersecting the drive motor; and means acting upon the second adjustment point for pivoting said transport about said first adjustment point thereby to set the azimuth of the transducer.

2. A transport assembly as claimed in claim 1 in which the transducer is supported proximate to said first adjustment point.

3. A head transport assembly for supporting a magnetic head in relation to a magnetic disk mounted for rotation on a drive motor and for moving the magnetic head through a radial path intersecting a drive spindle of the drive motor, said assembly comprising:

a head transport having a first adjustment point and a second adjustment point outboard of said first adjustment point in relation to the motor spindle;

means for supporting said head transport for movement along a guide path that is generally parallel to the radial path, said adjustment points being substantially collinear with said guide path;

means for mounting the head on said head transport in substantial coincidence with a tangent to the radial path taken through the first point;

means acting upon the first adjustment point for pivoting said head transport about an axis orthogonal to said guide path at said second adjustment point thereby to intersect the head with the radial path; and means acting upon the second adjustment point for pivoting said head transport about an axis orthogonal to said guide path at said first adjustment point thereby to set the azimuth of the head.

4. A head transport assembly as claimed in claim 3 further including;

means acting remotely of said head mounting means for pivoting the head about said tangent to set the tilt angle of the head.

5. A head transport assembly for supporting a magnetic head in relation to a magnetic disk mounted for rotation on a drive motor and for moving the magnetic head through a radial path intersecting a drive spindle of the drive motor, said assembly comprising:

a housing for supporting the drive motor, said housing having a flat guiding surface;

a head transport sled having first and second adjustment points;

a guide rod that is supported against the housing and oriented generally parallel to the radial path, said adjustment points being substantially collinear with said guide rod with the first point located nearer to the drive spindle;

means for supporting said head transport sled against said guide rod for sliding movement relative to said housing;

means for mounting the head on said head transport sled proximate to said first adjustment point;

means acting upon the first adjustment point for pivoting said head transport sled in relation to said second adjustment point thereby to intersect the head with the radial path; and means acting upon the second adjustment point for pivoting said head transport sled in relation to said first adjustment point thereby to adjust the azimuth of the head.

6. The assembly as claimed in claim 5 in which the head is mounted in substantial collinear relation to a tangent taken through the radial path and the first adjustment point, the assembly further comprising means for pivoting said head transport sled through said tangent to adjust the tilt angle of the head.

7. A method of adjusting the radial tracking orientation and the azimuth of a magnetic head in relation to a radial path adjacent a recording medium mounted for rotation on a drive motor and intersecting a drive spindle of the drive motor, the head being supported for movement relative to a guide path that is generally parallel to the radial path, the adjustment being performed in relation to first and second adjustment points that are substantially collinear with the guide path with the first adjustment point being proximate the head and nearer to the drive spindle, the method comprising the steps of:

adjusting the radial orientation of the head by acting upon the first adjustment point and pivoting the head in relation to the second adjustment point until the head intersects the radial path; and adjusting the azimuth of the head by acting upon the second adjustment point and pivoting the head in relation to the first adjustment point until the azimuth of the head is set to a predetermined angle.

8. The method as claimed in claim 7 in which the head is mounted in substantial collinear relation to a tangent taken through the radial path and the first adjustment point, the method further comprising the step of adjusting the tilt angle of the head by pivoting the head about the tangent until a predetermined tilt angle is set.

* * * * *